United States Patent Office 3,385,867
Patented May 28, 1968

3,385,867
PENTAHALOOXATRICYCLONONENES AND
METHOD OF PREPARATION
Wen-H. Chang, Gibsonia, Pa., assignor to Pittsburgh Plate
Glass Company, Pittsburgh, Pa., a corporation of
Pennsylvania
No Drawing. Filed Aug. 28, 1964, Ser. No. 392,910
12 Claims. (Cl. 260—346.2)

ABSTRACT OF THE DISCLOSURE

This invention relates to compounds corresponding to the formula:

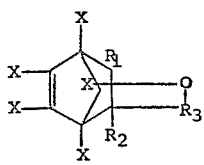

where X is selected from the group consisting of chlorine and bromine, $R_1$ and $R_2$ are selected from the group consisting of hydrogen, phenyl and alkyl groups having 1 to 6 carbon atoms and where $R_3$ is selected from the group consisting of hydrogen and alkyl groups having 1 to 6 carbon atoms, at least one of $R_1$ and $R_2$ being hydrogen and at least one of $R_1$, $R_2$, and $R_3$ being a substituent other than hydrogen, prepared by reacting a hexahalocyclopentadiene with a substituted allyl alcohol. The compounds are useful as pesticides and are fire retardant additives to polyurethanes and polyesters.

This invention relates to the reaction of halogenated cyclopentadienes with substituted allyl alcohols and the products of that reaction. More particularly, this invention relates to the reaction of halogenated cyclopentadienes with organo-substituted allyl alcohols in the presence of an alkaline condensation catalyst.

In Patent No. 2,918,479 granted Dec. 22, 1959, R. F. Seffl discloses the reaction of halocyclopentadiene with allyl alcohol in the presence of an alkaline condensation agent to produce compounds corresponding to the formula:

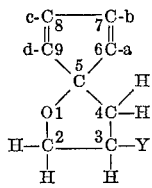

where $a$, $b$, $c$ and $d$ represent chlorine, bromine or hydrogen and Y represents chlorine or bromine.

In view of the teachings of this patent, it would be thought that where an organo-substituted allyl alcohol is utilized in an analogous reaction, a similar compound bearing organic substituents on the 2, 3 or 4 carbon atoms would be produced; or because of steric hindrance and/or electronic contributions, the reaction would fail to proceed at all.

It has now been found, however, that the reaction of organo-substituted allyl alcohols with hexahalocyclopentadiene in the presence of a base produces compounds of the formula:

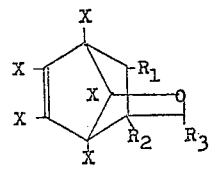

where X is selected from the group consisting of chlorine and bromine, preferably chlorine, $R_1$ and $R_2$ are selected from the group consisting of hydrogen, phenyl and alkyl groups containing 1 to 6 carbon atoms, and where $R_3$ is selected from the group consisting of hydrogen and alkyl groups containing 1 to 6 carbon atoms, at least one of $R_1$ and $R_2$ being hydrogen and at least one of $R_1$, $R_2$ and $R_3$ being a substituent other than hydrogen. Examples of such compounds include:

1,2,3,4,7-pentachloro-6-methyl-9-oxa-2-tricyclo
  [2.2.1.2$^{5,7}$]nonene
1,2,3,4,7-pentabromo-6-methyl-9-oxa-2-tricyclo
  [2.2.1.2$^{5,7}$]nonene
1,2,3,4,7-pentachloro-6-phenyl-9-oxa-2-tricyclo
  [2.2.1.2$^{5,7}$]nonene
1,2,3,4,7-pentachloro-8-methyl-9-oxa-2-tricyclo
  [2.2.1.2$^{5,7}$]nonene
1,2,3,4,7-pentabromo-8-methyl-9-oxa-2-tricyclo
  [2.2.1.2$^{5,7}$]nonene
1,2,3,4,7-pentachloro-5-methyl-9-oxa-2-tricyclo
  [2.2.1.2$^{5,7}$]nonene
1,2,3,4,7-pentabromo-5-methyl-9-oxa-2-tricyclo
  [2.2.1.2$^{5,7}$]nonene
1,2,3,4,7-pentachloro-6-propyl-9-oxa-2-tricyclo
  [2.2.1.2$^{5,7}$]nonene
1,2,3,4,7-pentachloro-8-ethyl-9-oxa-2-tricyclo
  [2.2.1.2$^{5,7}$]nonene
1,2,3,4,7-pentachloro-5-ethyl-9-oxa-2-tricyclo
  [2.2.1.2$^{5,7}$]nonene
1,2,3,4,7-pentachloro-6-phenyl-8-methyl-9-oxa-2-
  tricyclo[2.2.1.2$^{5,7}$]nonene
1,2,3,4,7-pentachloro-5-phenyl-9-oxa-2-tricyclo
  [2.2.1.2$^{5,7}$]nonene.

The substituted allyl alcohols which may be reacted with hexahalocyclopentadiene to produce the products of this invention correspond to the formula:

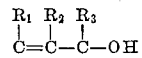

wherein $R_1$, $R_2$ and $R_3$ correspond to the definitions set forth above. Examples of such compounds include:

1-buten-3-ol
Methallyl alcohol
Cinnamyl alcohol
2-buten-1-ol
2-hexen-1-ol
2-ethyl-2-propen-1-ol
1-penten-3-ol
1-phenyl-1-propen-3-ol
2-phenyl-1-propen-3-ol The alkaline condensing agent may be an alkali metal hydroxide, such as sodium or potassium hydroxide, but it may also be the alcoholate which is formed by the reaction of the substituted allyl alcohol with an alkali metal such as sodium or potassium. The amount of alkali condensing agent necessary to promote the reaction is one mole of base for each mole of hexahalocyclopentadiene sought to be reacted, since a mole of alkali metal chloride is eliminated in the reaction. Usually, however, an excess of the base, commonly between 1.1 and 2.0 moles of the base per mole of hexahalocyclopentadiene, is employed in order to obtain good conversion.

The conditions under which the products of the invention are produced are not critical and may be widely varied. For example, the reaction may be carried out using an excess of the alcohol as a solvent. However, if desired, other inert solvents or diluents may be used. Examples of such solvents include aromatic solvents such as toluene, benzene and aliphatic solvents such as hexane or heptane. Preferred solvents include the dimethyl ether of ethylene glycol, dioxane and tetrahydrofuran.

The temperature at which the reaction may be conducted may also be widely varied. However, severe conditions are not necessary to produce the compounds of the invention and temperatures between about $-10°$ C. to about $100°$ C. are usually employed. Lower temperatures may be employed but are industrially impractical due to the length of time required to achieve complete conversion. Likewise, higher temperatures may be employed but are unnecessary and the conversion to the desired product is usually reduced by the formation of undesired by-products.

The compounds to which this invention relates will be further described by reference to the following examples, these examples being illustrative should not be construed as limiting the invention to their details.

Example I.—(1,2,3,4,7-pentachloro-6-phenyl-9-oxa-2-tricyclo[2.2.1.2$^{5,7}$]nonene)

To a 250-milliliter, three-necked, round bottom flask equipped with a stirrer and thermometer were added 21.6 grams (0.30 mole) of 2-buten-1-ol, 54.6 grams (0.20 mole) hexachlorocyclopentadiene and 100 milliliters of dimethyl ether of ethylene glycol. Solid potassium hydroxide (200 grams, 85 percent pure, 0.30 mole) was added in small portions at 20° C.-30° C. The reaction mixture was then stirred at room temperature for four days. Water was added to the reaction product and some solid appeared. After all of the water layer was removed, the solid and the organic layer was dissolved in ether and was washed with water twice. The solvent of the ether layer was then removed and the residue was distilled to give 42.5 grams of the product, boiling point 136° C./ 0.20 millimeter, solidified, and 6.5 grams of the pot residue. This distillate was recrystallized five times to give 32.0 grams (52.0 percent) of the product, melting point 171° C. The product was analyzed.

Analysis.—Calculated for $C_9H_7Cl_5O$: Carbon, 35.05%; hydrogen, 2.29%; chlorine, 57.48%. Found: Carbon, 35.29%; hydrogen, 2.33%; chlorine, 57.60%.

Example II.—(1,2,3,4,7-pentachloro-6-phenyl-9-oxa-2-tricyclo[2.2.1.2$^{5,7}$]nonene)

To a three-necked, 1-liter, round bottom flask equipped with stirrer and thermometer were added 40.2 grams (0.30 mole) of cinnamyl alcohol, 54.6 grams (0.20 mole) of hexachlorocyclopentadiene and 100 milliliters of dimethyl ether of ethylene glycol. Sodium potassium hydroxide (16.0 grams, 85 percent pure, 0.24 mole) was added in small portions in a period of four hours at 20° C.-30° C. This reaction mixture was then stirred at room temperature for 7.5 hours and kept unstirred at room temperature overnight. Water was added and a dark solid product precipitated. This solid was collected by filtration. After washing with water, it was dissolved in ether and was again washed with water three times. The ether layer was dried to give 60.5 grams of product. A half of the product was distilled in small portions and 21.3 grams (57.2 percent) of the product, boiling point 160° C.-180° C. at 1.0-0.6 millimeters with 5.15 grams of undistillable material. The undistilled fraction was dissolved in ether and was crystallized in hexane to give 19.5 grams of the product which was identical with the distilled product shown by infrared analysis. This mixture was crystallized four times from ether-hexane to give the product melting point 117° C.-119° C.

Analysis.—Calculated for $C_{14}H_9Cl_5O$: Carbon, 45.38%; hydrogen, 2.45%; chlorine, 47.85%. Found: Carbon, 44.95%; hydrogen, 2.44%; chlorine, 47.87%.

Example III.—(1,2,3,4,7-pentachloro-5-methyl-9-oxa-2-tricyclo[2.2.1.2$^{5,7}$]nonene)

To a three-necked, 1-liter, round bottom flask equipped with stirrer and thermometer were added 43.2 grams (0.60 mole) of methallyl alcohol, 109.2 grams (0.40 mole) of hexachlorocyclopentadiene and 150 milliliters dimethyl ether of ethylene glycol. Solid potassium hydroxide (32.0 grams, 85 percent pure, 0.48 mole) was added in portions at 20° C.-30° C. in a period of four hours while the flask was cooled externally. This mixture was stirred overnight and to this product water was added to precipitate the oil. This oily product was dissolved in ether and was washed with water till neutral. It was then distilled to give a yield of 78.7 percent.

(1) 2.3 grams, boiling point 50° C.-74° C. at 0.03 millimeter
(2) 94.5 grams, boiling point 74° C.-84° C. at 0.03 millimeter, $n_D^{24}$ 1.5464
(3) pot residue, 8.5 grams Two was shown a pure compound by gas chromatography analysis. It solidified on standing. Recrystallization from ether-hexane at $-78°$ C. gave a product with a melting point of 49° C.-50° C.

Analysis.—Calculated for $C_9H_7Cl_5O$: Carbon, 35.05%; hydrogen, 2.29%; chlorine, 57.48%. Found: Carbon, 34.85%; hydrogen, 2.29%; chlorine, 57.49%.

Example IV.—(1,2,3,4,7-pentachloro-8-methyl-9-oxa-2-tricyclo[2.2.1.2$^{5,7}$]nonene)

To a three-necked, 1-liter flask equipped with stirrer and thermometer were added 21.6 grams (0.30 mole) of 1-buten-3-ol, 54.6 grams (0.20 mole) of hexachlorocyclopentadiene and 100 milliliters of dimethyl ether of ethylene glycol. Solid potassium hydroxide (16.0 grams, 85 percent pure, 0.24 mole) was added in small portions in a period of four hours at 20° C.-30° C. After the addition, the mixture was again stirred for eight hours. After standing at room temperature overnight water was added and the product was crystallized. The filtrate was dissolved in ether and was washed with water for several times until neutral. The solvent was removed and was then distilled. There was obtained 7.0 grams of hexachlorocyclopentadiene, boiling point 60° C.-80° C. at 0.08 millimeter and 22.0 grams of the solid product, boiling point 100° C.-110° C. at 0.08 millimeter. The 22.0 gram, dark solid, was also distilled to give 19.0 grams of the solid product, boiling point 100° C.-110° C. at 0.3 millimeter, with a yield of 41.2 percent. Both of the solid fractions were mixed and crystallized from ether-hexene four times to give 20.2 grams of the product, melting point 102° C.-103.5° C., which was gas chromatographic pure.

Analysis.—Calculated for $C_9H_7Cl_5O$: Carbon, 35.05%; hydrogen, 2.29%; chlorine, 57.49%. Found: Carbon, 35.01%; hydrogen, 2.33%; chlorine, 57.65%.

The compounds of this invention are useful in several varied applications. They find utility, for example, as pesticides and specifically as insecticides and nematocides.

In addition to their use as pesticides, the compounds of this invention may be used as additives in polyurethane foam compositions and polyester resins in order to increase the fire retardancy of these materials. For example, the compounds of this invention may be mixed with the isocyanate component before reacting with a polyol in the presence of a blowing agent. Likewise, in the production of fire retardant polyesters, the compounds of this invention may be dissolved or dispersed in the cross-linking monomer, such as styrene, prior to mixing with a curing agent for an unsaturated polyester resin. In order to produce fire retardancy, these compounds may be used alone or in conjunction with other known additives or halogen or phosphorus containing base resins.

In addition, the compounds of this invention having reactive substituents may undergo further reaction to produce many useful compounds.

Although specific examples of the invention have been set forth hereinabove, it is not intended that the invention be limited solely thereto, but to include all of the variations and modifications falling within the scope of the appended claims.

I claim:

1. A compound corresponding to the formula:

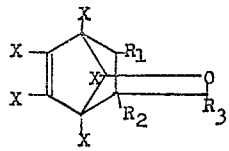

where X is selected from the group consisting of chlorine and bromine, $R_1$ and $R_2$ are selected from the group consisting of hydrogen, phenyl and alkyl groups having 1 to 6 carbon atoms and where $R_3$ is selected from the group consisting of hydrogen and alkyl groups having 1 to 6 carbon atoms, at least one of $R_1$ and $R_2$ being hydrogen and at least one of $R_1$, $R_2$ and $R_3$ being a substituent other than hydrogen.

2. A compound as in claim 1 where X is chlorine.
3. 1,2,3,4,7-pentachloro - 5 - alkyl - 9 - oxa - 2 - tricyclo [2.2.1.2$^{5,7}$]nonene wherein the alkyl group has 1 to 6 carbon atoms.
4. 1,2,3,4,7-pentabromo - 5 - alkyl - 9 - oxa - 2 - tricyclo [2.2.1.2$^{5,7}$]nonene wherein the alkyl group has 1 to 6 carbon atoms.
5. 1,2,3,4,7-pentachloro - 6 - alkyl - 9 - oxa - 2 - tricyclo [2.2.1.2$^{5,7}$]nonene wherein the alkyl group has 1 to 6 carbon atoms.
6. 1,2,3,4,7-pentabromo - 6 - alkyl - 9 - oxa - 2 - tricyclo [2.2.1.2$^{5,7}$]nonene wherein the alkyl group has 1 to 6 carbon atoms.
7. 1,2,3,4,7-pentachloro - 8 - alkyl - 9 - oxa - 2 - tricyclo [2.2.1.2$^{5,7}$]nonene wherein the alkyl group has 1 to 6 carbon atoms.
8. 1,2,3,4,7-pentabromo - 8 - alkyl - 9 - oxa - 2 - tricyclo [2.2.1.2$^{5,7}$]nonene wherein the alkyl group has 1 to 6 carbon atoms.
9. 1,2,3,4,7-pentachloro-6 - phenyl - 9 - oxa - 2 - tricyclo [2.2.1.2$^{5,7}$]nonene.
10. 1,2,3,4,7-pentachloro-5-phenyl - 9 - oxa - 2 - tricyclo [2.2.1.2$^{5,7}$]nonene.
11. A method of preparing a compound corresponding to the formula:

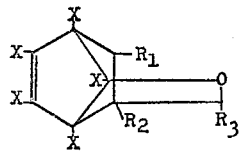

where X is selected from the group consisting of chlorine and bromine, $R_1$ and $R_2$ are selected from the group consisting of hydrogen, phenyl and alkyl groups having 1 to 6 carbon atoms and where $R_3$ is selected from the group consisting of hydrogen and alkyl groups having 1 to 6 carbon atoms, at least one of $R_1$ and $R_2$ being hydrogen and at least one of $R_1$, $R_2$ and $R_3$ being a substituent other than hydrogen, which comprises mixing and reacting hexachlorocyclopentadiene with an organo-substituted allyl alcohol corresponding to the formula:

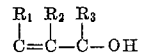

where $R_1$ and $R_2$ are selected from the group consisting of hydrogen, phenyl and alkyl groups having 1 to 6 carbon atoms and where $R_3$ is selected from the group consisting of hydrogen and alkyl groups containing 1 to 6 carbon atoms, at least one of $R_1$ and $R_2$ being hydrogen and at least one of $R_1$, $R_2$ and $R_3$ being a substituent other than hydrogen, in the presence of at least one mole per mole of hexachlorocyclopentadiene of an alkali metal condensation agent.

12. A method as in claim 11 where the alkali metal condensation agent is selected from the group consisting of sodium hydroxide, potassium hydroxide and the sodium and potassium alcoholates of the corresponding organo-substituted allyl alcohol.

References Cited

UNITED STATES PATENTS 3,281,317  10/1966  Mark _____ 260—346.2

NICHOLAS S. RIZZO, *Primary Examiner.*